(12) United States Patent
Wirth

(10) Patent No.: US 6,649,895 B1
(45) Date of Patent: Nov. 18, 2003

(54) DISPERSED HARTMANN SENSOR AND METHOD FOR MIRROR SEGMENT ALIGNMENT AND PHASING

(75) Inventor: Allan Wirth, Bedford, MA (US)

(73) Assignee: Adaptive Optics Associates, Inc., Cambridge, MA (US)

( * ) Notice: Subject to any disclaimer, the term of this patent is extended or adjusted under 35 U.S.C. 154(b) by 0 days.

(21) Appl. No.: 09/766,211

(22) Filed: Jan. 19, 2001

Related U.S. Application Data
(60) Provisional application No. 60/218,190, filed on Jul. 14, 2000.

(51) Int. Cl.$^7$ ............................................. G02B 23/00
(52) U.S. Cl. ..................... 250/201.9; 356/121; 356/512
(58) Field of Search ............................ 250/201.9, 332; 356/512–516, 521, 121; 359/846, 849

(56) References Cited

U.S. PATENT DOCUMENTS

| | | |
|---|---|---|
| 4,141,652 A | 2/1979 | Feinleib |
| 4,248,504 A | 2/1981 | Albertinetti et al. |
| 4,399,356 A | 8/1983 | Feinleib et al. |
| 4,474,467 A | 10/1984 | Hardy et al. |
| 4,696,573 A | 9/1987 | Hutchin |
| 4,725,138 A | 2/1988 | Wirth et al. |
| 4,737,621 A | 4/1988 | Gonsiorowski et al. |
| 5,093,563 A | 3/1992 | Small et al. |
| 5,113,064 A | 5/1992 | Manhart |
| 5,317,389 A * | 5/1994 | Hochberg et al. ............ 365/511 |
| 5,493,391 A | 2/1996 | Neal et al. |
| 5,629,765 A | 5/1997 | Schmutz |
| 5,798,878 A | 8/1998 | Asari et al. |
| 5,864,381 A | 1/1999 | Neal et al. |
| 5,912,731 A | 6/1999 | DeLong et al. |
| 5,936,720 A | 8/1999 | Neal et al. |
| 6,052,180 A | 4/2000 | Neal et al. |
| 6,108,121 A | 8/2000 | Mansell et al. |
| 6,113,242 A | 9/2000 | Marker et al. |
| 6,130,419 A | 10/2000 | Neal |
| 6,163,381 A * | 12/2000 | Davies et al. ................ 356/121 |
| 6,184,974 B1 | 2/2001 | Neal et al. |
| 6,278,100 B1 * | 8/2001 | Friedman et al. ......... 250/201.9 |

OTHER PUBLICATIONS

Web–based publication entitled "Absolute Distance Inteferometry" by the Institute of Physics at E.M. Arndt University, http://www2.physik.uni–greifswald.de/laser/forschung/adi eng.html, 2001, pp. 1–3.

Chapter 1 of AOA's WaveScope System User Manual entitled "System Overview" by Adaptive Optics Associates, Inc., http://www.aoainc.com/technologies/adaptiveandmicrooptics/wavescope/CHAP6.html, 2001, pp. 1–5.

Chapter 4 of AOA's WaveScope System User Manual entitled "Alignment" by Adaptive Optics Associates, Inc., http://www.aoainc.com/technologies/adaptiveandmicrotics/wavescope/Aignment.htm, 2001, pp. 1–25.

(List continued on next page.)

Primary Examiner—Stephone B. Allen
(74) Attorney, Agent, or Firm—Thomas J. Perkowski, Esq., P.C.

(57) ABSTRACT

A dispersed Hartmann sensor includes a Hartmann lenslet in combination with a dispersive element, whereby a Hartmann spot formed by light passing through the Hartman lenslet is dispersed parallel to the phase step of the light. The shape of the blur spot can then be examined at many wavelengths. Measuring the size of a discontinuity in the wavefront of light is then performed by forming a single image of the wavefront, dispersing the image in wavelength using a combination of a Hartman lenslet and a dispersive element, and analyzing the dispersed image along a dispersion direction of the dispersed image to measure the size of the discontinuity.

10 Claims, 10 Drawing Sheets

OTHER PUBLICATIONS

Chapter 5 of AOA's WaveScope System User Manual entitled "Calibration" by Adaptive Optics Associates, Inc., http://www.aoainc.com/technologies/adaptiveandmicrootics/wavescope/Calibration., 2001, pp. 1–23.

Chapter 8 of AOA's WaveScope System User Manual entitled "Basic Theory of Hartmann Sensing" by Adaptive Optics Associates, Inc., http://www.aoainc.com/technologies/adaptivemicrooptics/wavescope/CHAP2.html, 2001, pp. 1–5.

Textbook entitled "Introduction to Adaptive Optics" by Tyson, Tutorial Texts in Optical Engineering, SPIE Press, vol. TT41,2000, pp. 1–117.

Web–based Publication entitled "Low–Cost Adaptive Optics" by University of Edinburgh et al., http://op.ph.ic.ac.uk/ao/locado.html, Mar. 1999, pp. 1–3.

Web–based Publication entitled "Two–frequency phase–shifting projection moire topography" by Kim et al., http://www.spie.org/web/abstracts/3500/3520.html, vol. 3520, 1998, pp. 36–42.

Web–based publication entitled "Interferometer satellite synthetic aperture radar and its application to the observation of Greenland ice sheet motion" by Frick, *http://www.icg.tu–graz.ac.at/Education/Diplomarbeiten/1996/frick*, 1996, pp. 1–2.

Textbook entitled "Introduction to Wavefront Sensors" by Geary, Tutorial Texts in Optical Engineering, vol. TT18, SPIE Optical Engineering Press, 1995, pp. 1–169.

* cited by examiner

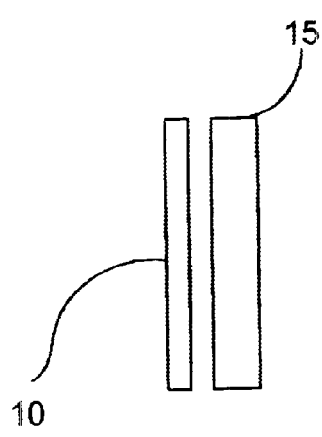
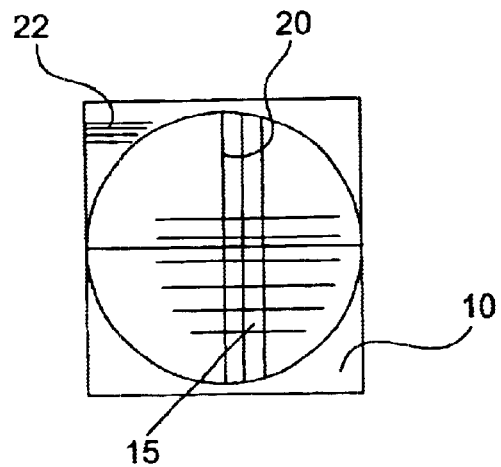
FIG. 4A          FIG. 4B
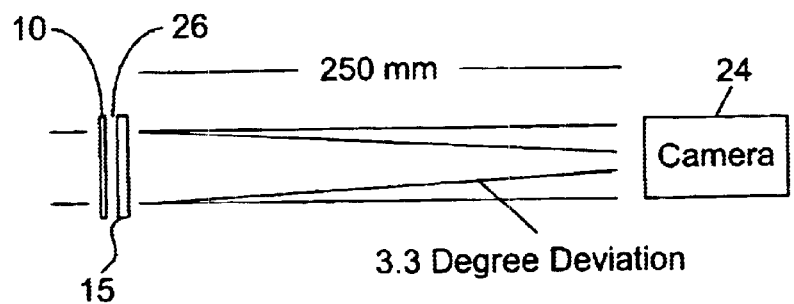
FIG. 5

DISPERSED HARTMANN SENSOR AND METHOD FOR MIRROR SEGMENT ALIGNMENT AND PHASING

CROSS-REFERENCE TO RELATED APPLICATIONS

This application claims priority from U.S. Provisional Application Ser. No. 60/218,190 entitled "DISPERSED HARTMANN SENSOR AND METHOD FOR MIRROR SEGMENT ALIGNMENT AND PHASING" filed Jul. 14, 2000, incorporated herein by reference.

FIELD OF THE INVENTION

This invention relates to the field of adaptive optic systems used to overcome blurring in images caused by atmospheric turbulence, and in particular, to a new phase sensor for adaptive optics systems.

BACKGROUND OF THE INVENTION

An adaptive optics system automatically corrects for light distortions in the medium of transmission. For example, if you look far down a road on a very hot and sunny day, you will often see what is usually called a mirage. What you are seeing is the result of rapidly changing air temperature causing the air to act like a thick, constantly bending lens. As another example, the twinkling of stars is due to changes in the atmosphere surrounding the Earth. Although twinkling stars are pleasant to look at, the twinkling causes blurring on an image obtained through a telescope. An adaptive optics system measures the characteristics of the lens and corrects for atmospheric turbulence using a deformable mirror (DM) controlled by a computer. The device that measures the distortions in the incoming wavefront of light is called a wavefront sensor.

Light from a nominal point source above the atmosphere enters the primary aperture of an adaptive optics system and is split between a camera and a wavefront sensor employed therein (See FIG. 1). The sensor measures the wavefront distortion and controls (i) a tilt mirror to stabilize the image and (ii) a deformable mirror (DM) which restores the image sharpness lost to atmospheric turbulence. In recent years, the technology and practice of adaptive optics have become well known in the astronomical community.

The most commonly used approach in a wavefront sensor is the Shack-Hartmann method. As shown in FIG. 2, this approach is completely geometric in nature and so it has no dependence on the coherence of the sensed optical beam. The incoming wavefront is broken into an array of spatial samples, called subapertures of the primary aperture, by a two dimensional array of lenslets. The subaperture sampled by each lenslet is brought to a focus at a known distance F behind each array. Because the lateral position of the focal spot depends on the local tilt of the incoming wavefront, a measurement of all the subaperture spot positions is a measure of the gradient of the incoming wavefront. A two-dimensional integration process called reconstruction can then be used to estimate the shape of the original wavefront, and from there, derive the correction signals for the deformable mirror.

Geometric sensors are more rugged and provide measurement accuracies that compare favorably with interferometric sensors. The geometric sensor divides the full aperture input wavefront into a number of subaperture images with an array of small diameter lenses. The subaperture images are focused as a two dimensional spot pattern onto a photodetector array which provides the X-Y phase gradient of each spot image as a representation of the average tip/tilt of each subaperture segment. Each segment phase gradient is converted to a phase estimate by a microprocessor-based reconstruction algorithm and the sum of the phase estimates provides a reconstruction of the wavefront's full aperture phase profile. Measurement inaccuracies due to optical distortion or misalignment of the sensor's optics are minimized by combining the received wavefront with an internal reference laser wavefront upstream of the subaperture optics and measuring subaperture tilt/tip as the difference in spot position between the two waves.

Since the reference wave suffers no atmospheric distortion, any displacement of the reference wave's subaperture spot position from that of the subaperture's chief ray is attributable to sensor distortion. The differential spot position between the two waves, therefore, provides an accurate measure of the received wavefront's distortion. The geometric sensor is more tolerant of vibration and temperature conditions which, together with its simplicity, allows it to be used in a greater number of adaptive optic applications outside of the laboratory.

SUMMARY OF THE INVENTION

Briefly stated, a dispersed Hartmann sensor includes a Hartmann lenslet in combination with a dispersive element, whereby a Hartmann spot formed by light passing through the Hartman lenslet is dispersed parallel to the phase step of the light. The shape of the blur spot can then be examined at many wavelengths. Measuring the size of a discontinuity in the wavefront of light is then performed by forming a single image of the wavefront, dispersing the image in wavelength using a combination of a Hartman lenslet and a dispersive element, and analyzing the dispersed image along a dispersion direction of the dispersed image to measure the size of the discontinuity.

According to an embodiment of the invention, a dispersed Hartmann sensor includes a Hartmann lenslet in combination with a dispersive element, whereby a Hartman spot formed by light passing through the Hartmann lenslet is dispersed at a known angle to a phase step of the light.

According to an embodiment of the invention, a method for measuring the size of a discontinuity in a wavefront of light includes the steps of (a) forming a single image of the wavefront; (b) dispersing the image in wavelength using a combination of a Hartman lenslet and a dispersive element; and (c) analyzing the dispersed image along a dispersion direction of the dispersed image to measure the size of the discontinuity.

According to an embodiment of the invention, a mirror array includes a first layer having a plurality of mirror segments, each mirror segment consisting of a center portion and a surrounding non-center portion; a second layer having a plurality of Hartmann subapertures and a plurality of dispersed Hartmann subapertures; said Hartmann subapertures being arranged over said center portions of said plurality of mirror segments; and said dispersed Hartmann subapertures being arranged over those edges where said plurality of mirror segments join one another.

According to an embodiment of the invention, a system for measuring the size of a discontinuity in a wavefront of light includes means for forming a single image of said wavefront; means for dispersing said image in wavelength using a combination of a Hartman lenslet and a dispersive element; and means for analyzing said dispersed image along a dispersion direction of said dispersed image to measure the size of said discontinuity.

BRIEF DESCRIPTION OF THE DRAWINGS

FIG. 4A shows a side view of the lens array and transmission grating of the laboratory breadboard system used to research the present invention.

FIG. 4B shows a top view of the lens array and transmission grating of FIG. 4A.

FIG. 5 shows a side view of the lens array and transmission grating of FIGS. 4A and 4B in relation to a camera used in the research of the present invention.

DETAILED DESCRIPTION OF THE PREFERRED EMBODIMENT

The dispersed Hartmann sensor concept is based on the well known dispersed fringe technique that has been used in long-baseline optical interferometers for some time (see, for example, Applied Optics vol. 35, #16, p.3002). In the dispersed fringe system, the beams from two telescope apertures are combined in the pupil plane and brought to a common focus. If the path lengths from the two apertures are closely matched, there will be interference between the two beams and fringes will be formed. For any given wavelength this fringe pattern shifts with changing path difference but the pattern repeats for every one wavelength change in path. This is known as a $2\pi$ ambiguity. If this focal spot is spectrally dispersed, the fringe pattern as a function of wavelength may be recorded. Since the ambiguity in path difference is one wavelength at the measurement wavelength, by measuring at multiple wavelengths it is possible to extend the unambiguous path difference measurement range very significantly.

Each subaperture of a Hartmann sensor forms a far-field spot image from the portion of the input beam captured by that subaperture. From the early days of optical analysis, it has been known that if a phase step is introduced across the entrance aperture of an imaging system, the far-field spot formed will take on the form of an unaberrated spot combined with a fringe pattern. This fringe pattern is formed in the same way as in the long baseline interferometer and suffers from the same $2\pi$ ambiguity in phase difference. Nonetheless, this property of the far-field spot has been used successfully to control the phase differences between segments in telescope primary mirrors.

Figure 3A:
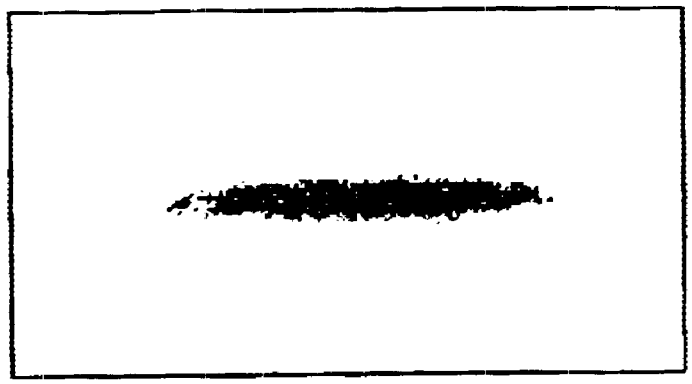
FIG. 3A shows data obtained with a laboratory breadboard dispersed Hartmann sensor.
Figure 3B:
FIG. 3B shows a simulation of the expected image from the breadboard system of FIG. 3A.

The dispersed Hartmann sensor of the present invention combines the idea of dispersing the fringe pattern to eliminate the $2\pi$ ambiguity, with the subaperture division concept of the Hartmann sensor. In the long baseline interferometer, the two full apertures are combined to form a single image. In the Hartmann sensor, unique images are formed by each of the multiple subapertures. A phase step may be introduced into the Hartmann subaperture if that subaperture, for example, bridges the gap between the two segments of a mirror. The two halves of the subaperture are then analogous to the two apertures of the long baseline interferometer. If such a phase step occurs within a dispersed subaperture, a very distinctive fringe pattern is formed. By analysis of this pattern, the size of the phase step can be determined without ambiguity. The distinctive fringe pattern is shown in FIG. 3A, which closely parallels the simulation of the expected image shown in FIG. 3B from the breadboard arrangement shown in FIGS. 4A–4B and 5.

Referring to FIGS. 4A–4B, and 5, a transmission grating 10 is one inch square and 3 mm thick. A lens array 15 includes epoxy on glass, one inch in diameter and 6 mm thick. Segment dividers are shown by a thick line as, for example, is indicated at 20. The grating direction is shown at 22. A camera 24 records the light transmitted through the grating/lens array combination 10, 15. The pupil plane is shown at 26.

Figures 6A, 6B, 6C:
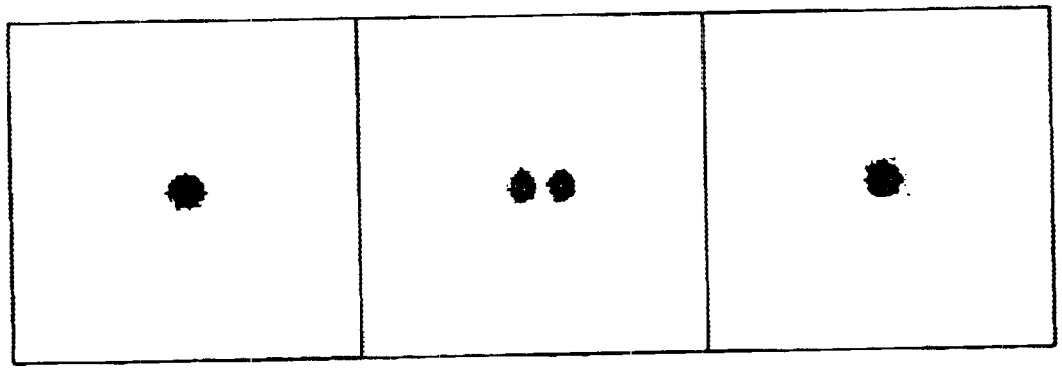
FIG. 6A shows a blur spot with a phase step of 0.2 wave.
FIG. 6B shows a blur spot with a phase step of 0.5 wave.
FIG. 6C shows a blur spot with a phase step of 1.0 wave.

This interferometric analog may be extended to understand the dispersed Hartmann sensor concept of the present invention. Just as in the dispersed fringe sensor, if the Hartmann spot is dispersed parallel to the edge of the phase step, one may observe the shape of the blur spot at many wavelengths. At each line perpendicular to the dispersion, the light distribution is characteristic of the blur spot formed by a Hartmann sensor at one particular wavelength. FIGS. 6A–6C show the results of a simulation of this arrangement. Each image is the blur spot formed by a Hartmann lenslet that has been combined with a dispersive element, which we refer to as a dispersed Hartmann sensor. In this simulation, the dispersion is in the vertical direction and covers the range from 0.5 $\mu$m at the bottom to 1.0 $\mu$m at the top. By examining the behavior of the light distribution along the dispersion direction, the $2\pi$ ambiguity may be resolved. A slice through the image along the dispersion direction yields an intensity profile that is exactly analogous to the output of a dispersed fringe sensor.

Figure 7:
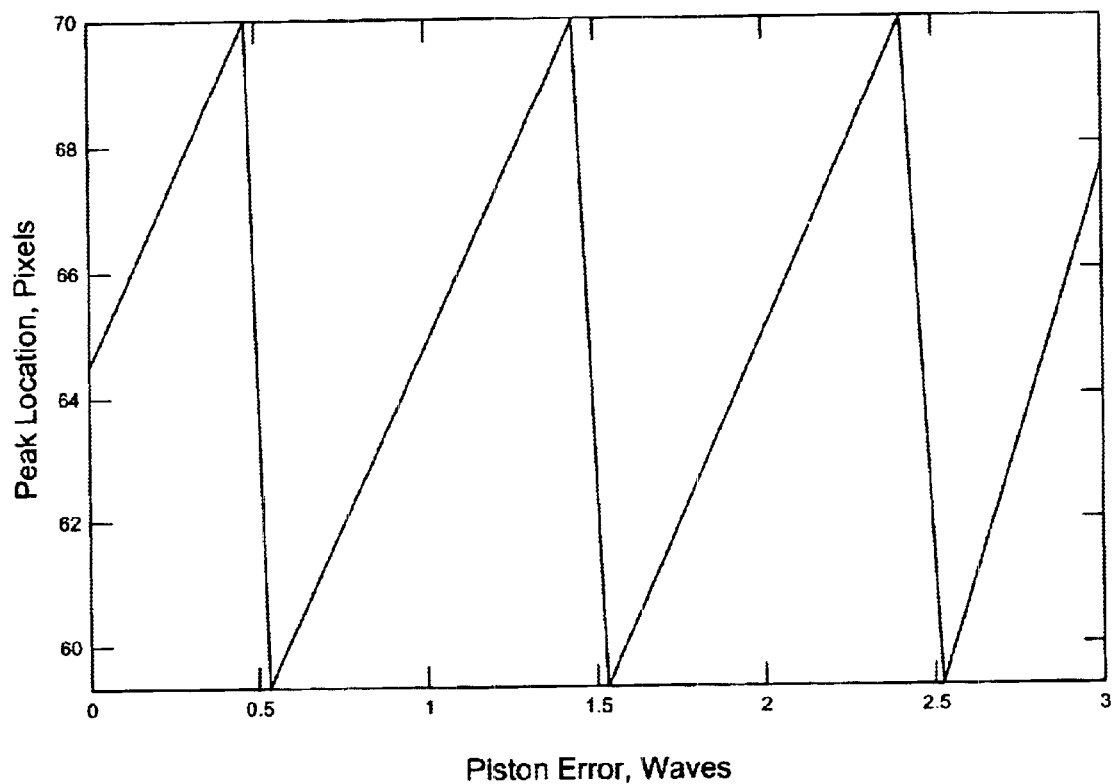
FIG. 7 shows how the position of the peak changes relative to the phase step.
Figures 8A, 8B, 8C:
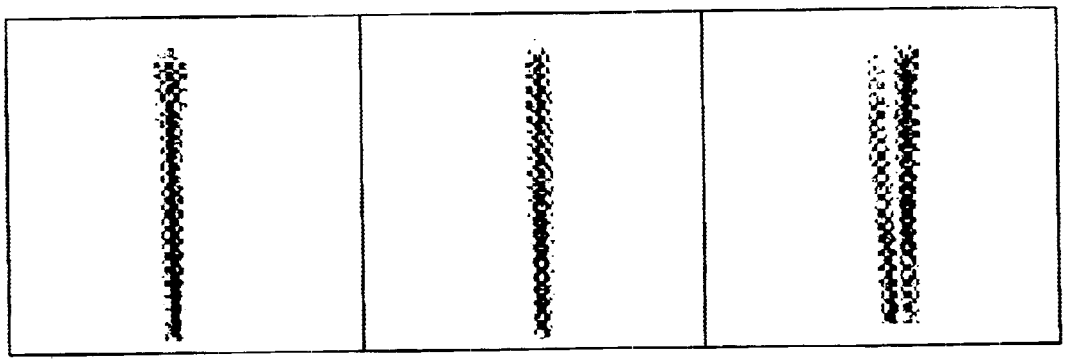
FIG. 8A shows a dispersed spot image from the present invention with a phase difference of $0.0\mu$.
FIG. 8B shows a dispersed spot image from the present invention with a phase difference of $0.1\mu$.
FIG. 8C shows a dispersed spot image from the present invention with a phase difference of $0.3\mu$.
Figures 8D, 8E, 8F:
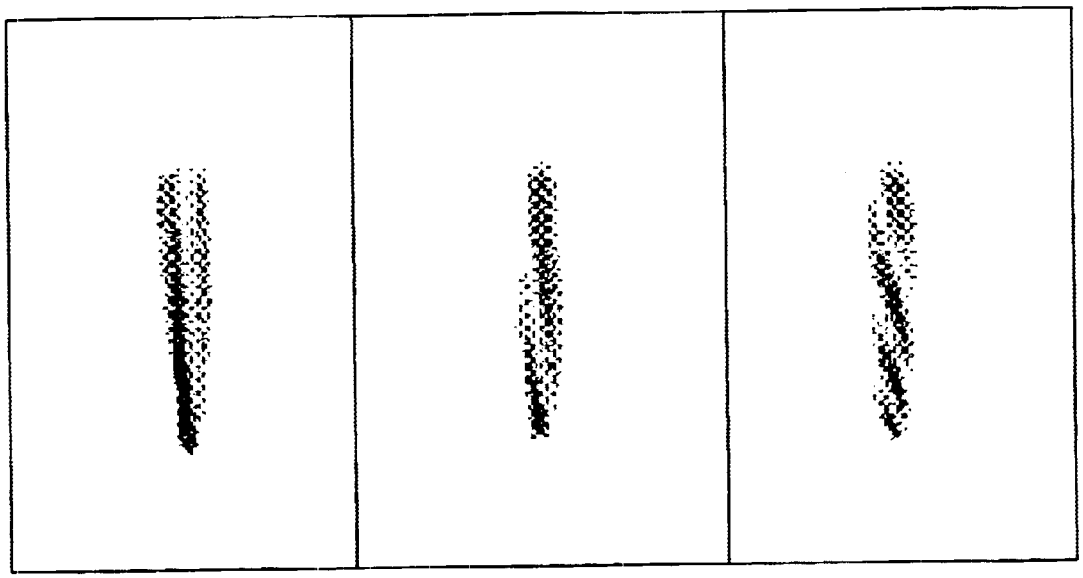
FIG. 8D shows a dispersed spot image from the present invention with a phase difference of $0.5\mu$.
FIG. 8E shows a dispersed spot image from the present invention with a phase difference of $1.0\mu$.
FIG. 8F shows a dispersed spot image from the present invention with a phase difference of $3.0\mu$.

A Hartmann sensor subaperture is sensitive to a phase step across the subaperture. This sensitivity has been successfully used to phase segmented telescopes such as those at the Keck Observatory. FIGS. 6A–6C show the effect of a phase step in a subaperture on the appearance of the blur spot. As the size of the step increases away from zero, power is shifted from the central lobe of the spot to the side lobe. In addition, the position of the central lobe shifts. This shift is directly proportional to the size of the phase step. Unfortunately, once the phase step reaches ½ wave, the "side lobe" becomes the brighter lobe. Thus using the position of the brighter lobe suffers from the same $2\pi$ ambiguity as an interferometer (FIG. 7). In fact, it is possible to consider the Hartmann sensor subaperture as an interferometer.

The spot pattern is analogous to the fringe pattern formed by a double slit, each side of the phase step representing one of the slits. This fringe pattern is contained in a envelope that is characteristic of the blur spot shape of one half of the subaperture. This interferometric analog may be extended to understand the dispersed Hartmann sensor concept. Just as in the dispersed fringe sensor, if the Hartmann spot is dispersed parallel to the edge of the phase step, we may observe the shape of the blur spot at many wavelengths. At each line perpendicular to the dispersion the light distribution will be characteristic of the blur spot formed by a Hartmann sensor at one particular wavelength. FIGS. 8A–8F show the results of a simulation of this arrangement. Each image is the blur spot formed by a Hartmann lenslet that has been combined with a dispersive element. Slicing horizontally through each image produces blur spots similar to FIGS. 6A–6C. Slicing at different locations produces blur spots at different wavelengths.

Figure 9:
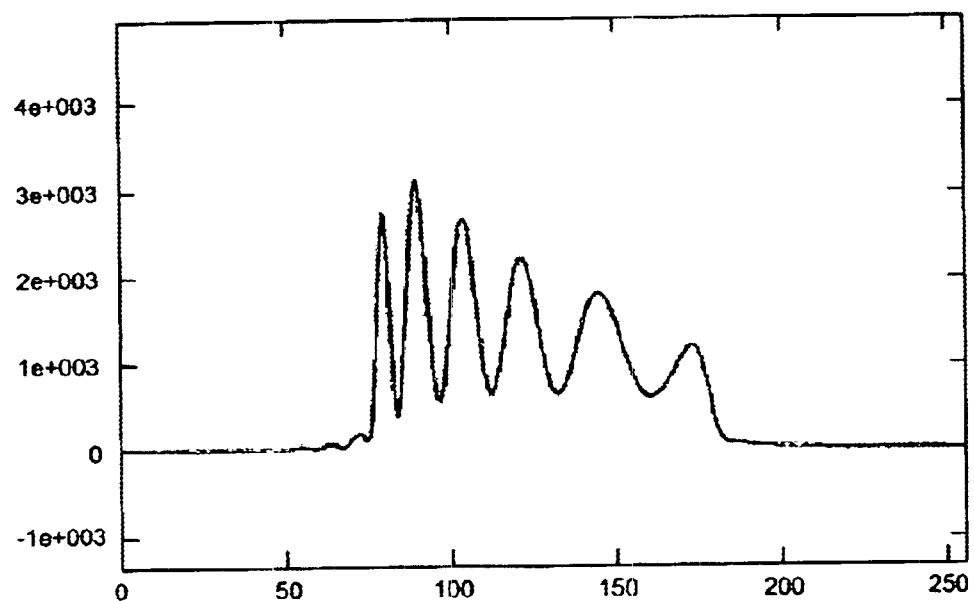
FIG. 9 shows a slice through a dispersed spot image from the present invention.

In this simulation, the dispersion is in the vertical direction and covers the range from 0.5 $\mu$m at the bottom to 1.0 $\mu$m at the top. By examining the behavior of the light distribution along the dispersion direction the $2\pi$ ambiguity may be resolved. A slice through the image along the dispersion direction yields an intensity profile that is exactly analogous to the output of the dispersed fringe sensor. Such a slice produced by the simulation is shown in FIG. 9.

The dispersed Hartmann sensor would thus be used in two modes. When the phase step is large the image is analyzed along the dispersion direction to yield an estimate of the phase error. This estimate is used to correct the error until the size of the step is reduced below ½ wave. At this point the cross-dispersion centroid information becomes unambiguous and the error may be further reduced. Simulations indicate that measurement of phase step errors of less than 1/50 wave should be possible. This one sensor then combines both the coarse and fine phase measurement capability in one monolithic optical element.

The Dispersed Hartmann Sensor of the present invention could be implemented in several ways. The dispersive element could be either refractive or diffractive or a combination of the two, e.g., a grism. A grism, or Carpenter prism, is a transmission grating mounted on a prism that has its angle chosen in such a way that the desired order of the grating passes through the grism undeviated. Holographic gratings are an appealing approach because they could be formed with their dispersive direction aligned along the direction of the phase step independently for each subaperture. A single dispersive element can be considered but complicates the analysis for phase steps that run at an angle to the dispersion direction.

Figure 10:
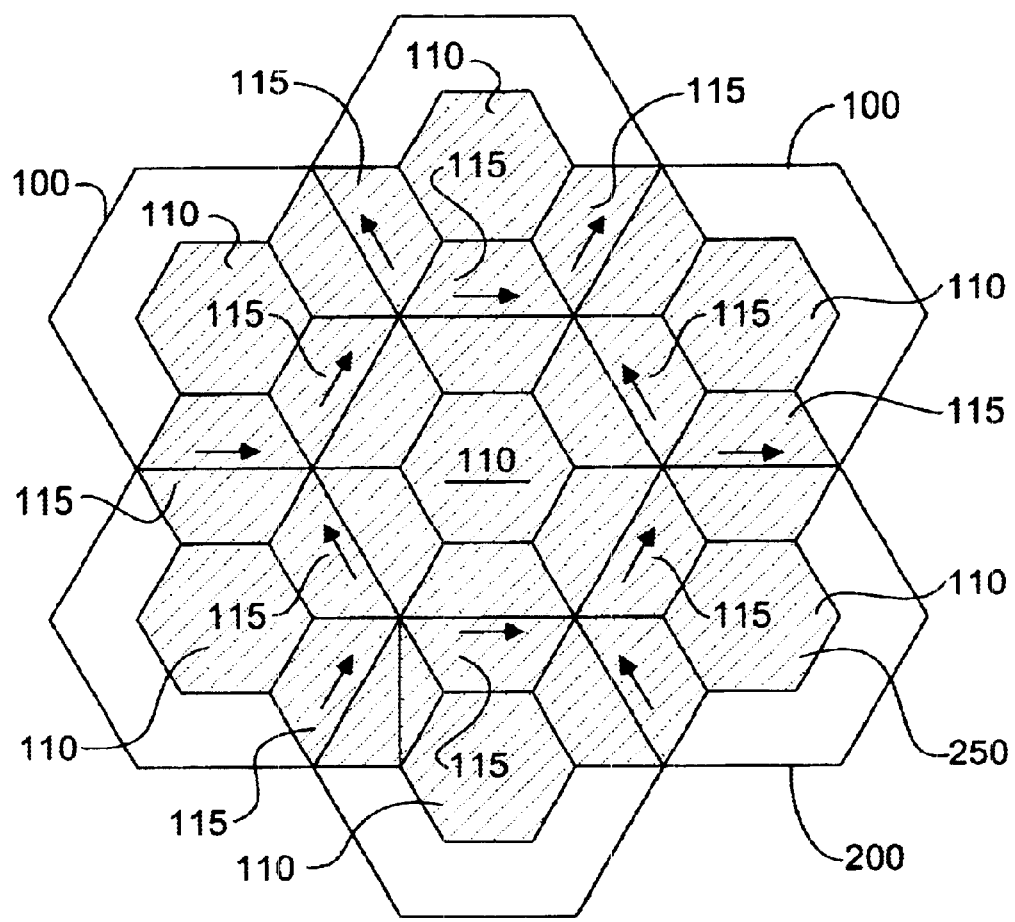
FIG. 10 shows a arrangement of subapertures according to an embodiment of the present invention.

Assuming that the dispersion direction may be set for each subaperture a potential arrangement of subapertures has been developed which is shown in FIG. 10. Two layers are shown in the figure. The bottom layer 200 is shown here with seven large hexagons 100, with six large hexagons arranged around the seventh, each of which is a mirror, or mirror segment. We use the term "mirror" to refer to the overall surface that is composed of individual "mirror segments." Here it is assumed that the mirror to be phased consists of hexagonal segments, although other shapes also work. The top layer 250 is shown here with 19 subapertures, each of which is hexagonal in shape. There are two types of subapertures shown here. Arranged around the six edges of the center mirror segment are six dispersed Hartmann subapertures 115 to measure the piston difference to adjacent mirror segments from the center mirror segment. Additional dispersed Hartmann subapertures 115 are between the centers of the other mirror segments. In the center of each mirror segment is a normal Hartmann subaperture 110 used to measure the tilt of the segment. This single subaperture may be replaced by many smaller subapertures if the segment requires figure measurement or control. This hybrid optical element would preferably be fabricated as a single unit with holographic gratings and refractive lenslets. It could be mounted in a retractable holder in a pupil plane of the telescope system. The resulting images would be collected with the science imager.

Figure 1:
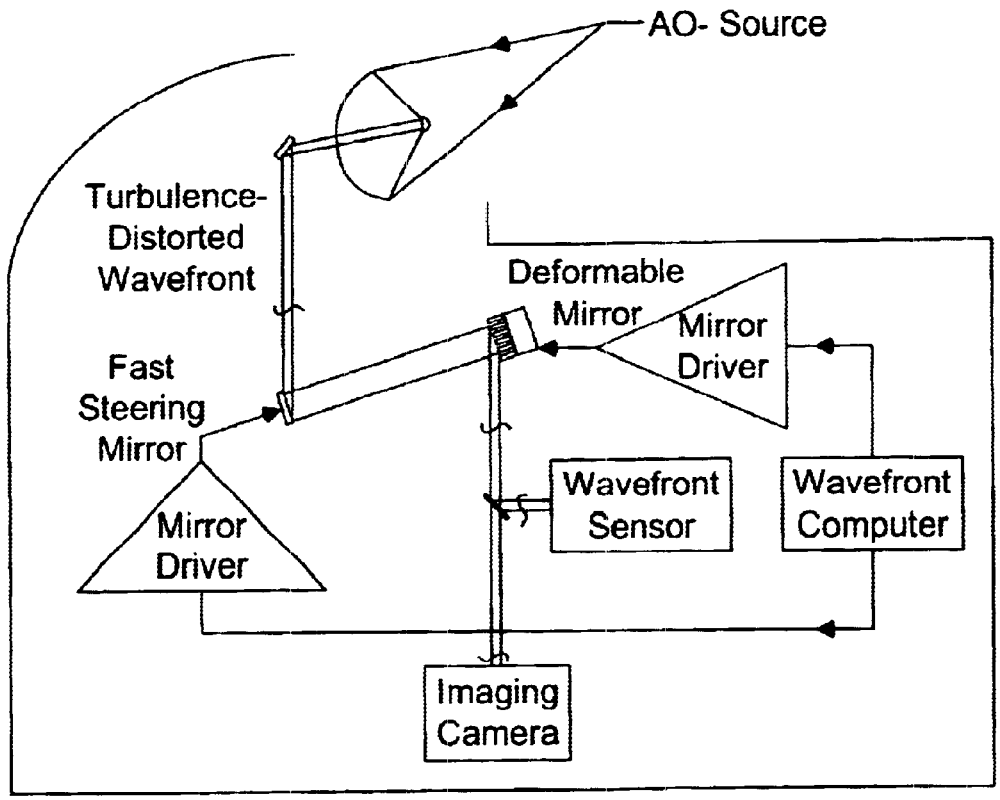
FIG. 1 shows an adaptive optics system according to the prior art.
Figure 2:
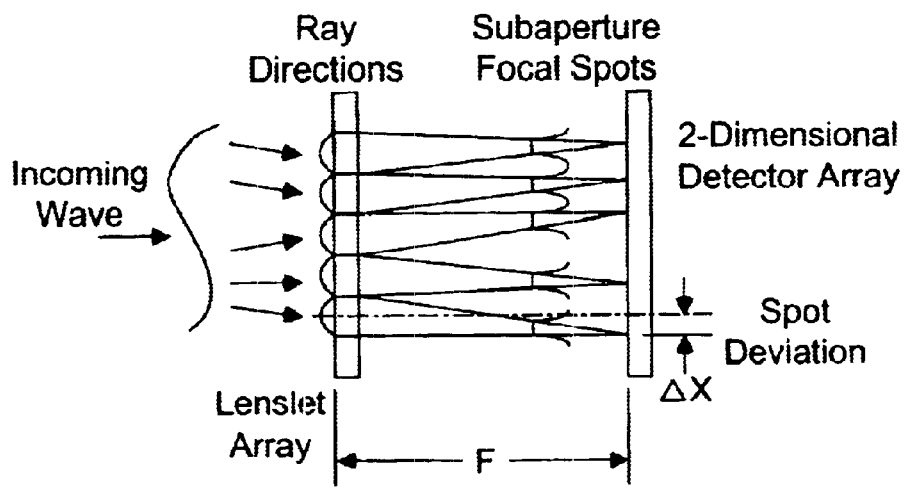
FIG. 2 shows a Shack-Hartmann sensor according to the prior art.
Figure 11A:
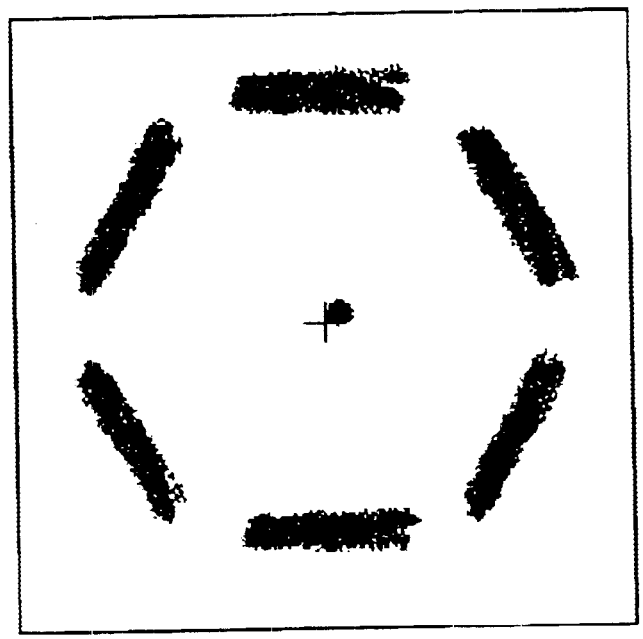
FIG. 11A shows a simulated image from the subaperture arrangement of FIG. 10 with piston and tilt errors between the center and outer segments.
Figure 11B:
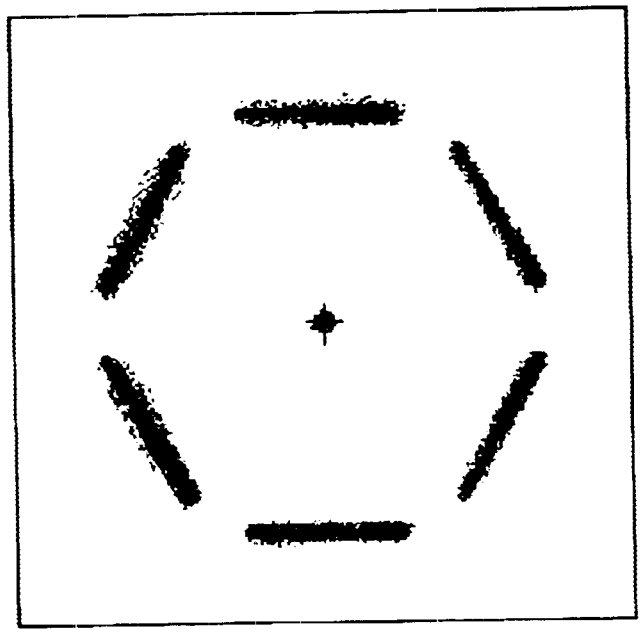
FIG. 11B shows a simulated image from the subaperture arrangement of FIG. 10 with no piston and tilt errors between the center and outer segments.

The procedure for aligning and phasing this set of segments begins by using the central subaperture tip and tilt error signals to point the segment correctly. The tilt alignment is performed by deforming the mirror segment so that it tilts in the proper direction. Phase alignment is performed by moving a piston attached to the back of the segment and changing the height of the segment. The goal is to make all parts of the incoming wave as shown in FIG. 2 reach the mirror segments at the same time and at the same angle. It is here assumed that a suitable reference position for each segment has been defined. Once the tilt error is minimized, the six dispersed sensors 115 are used to measure the piston differences. Initially, the along dispersion data are used to reduce the piston to a value below ½ wave, then the cross dispersion data are used to reduce the piston error to a very low limit. FIG. 11A shows a simulation of the image formed by this arrangement of subapertures for the case in which the central segment is both tilted and pistoned with respect to the others. FIG. 11B shows the case in which the segments are properly phased.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A dispersed Hartmann sensor, comprising:
   a Hartmann lenslet in combination with a dispersive element, whereby a Hartman spot formed by light passing through said Hartmann lenslet is dispersed at an angle to a phase step of said light.

2. The Hartmann sensor according to claim 1, wherein said angle is zero so that said light passing through said Hartmann lenslet is dispersed parallel to said phase step of said light.

3. The Hartmann sensor according to claim 1, wherein said dispersive element is a refractive element.

4. The Hartmann sensor according to claim 1, wherein said dispersive element is a diffractive element.

5. The Hartmann sensor according to claim 1, wherein said dispersive element is a combination of a diffractive element and a refractive element.

6. The Hartmann sensor according to claim 5, wherein said dispersive element is a grism.

7. The Hartmann sensor according to claim 5, wherein said dispersive element is a holographic grating.

8. A mirror array, comprising:
  a first layer having a plurality of mirror segments, each mirror segment consisting of a center portion and a surrounding non-center portion;
  a second layer having a plurality of Hartmann subapertures and a plurality of dispersed Hartmann subapertures;
  said Hartmann subapertures being arranged over said center portions of said plurality of mirror segments; and
  said dispersed Hartmann subapertures being arranged over those edges where said plurality of mirror segments join one another.

9. A method for measuring the size of a discontinuity in a wavefront of light, comprising the steps of:
  forming a single image of said wavefront;
  dispersing said image in wavelength using a combination of a Hartman lenslet and a dispersive element; and
  analyzing said dispersed image along a dispersion direction of said dispersed image to measure the size of said discontinuity.

10. A system for measuring the size of a discontinuity in a wavefront of light, comprising:
  means for forming a single image of said wavefront;
  means for dispersing said image in wavelength using a combination of a Hartman lenslet and a dispersive element; and
  means for analyzing said dispersed image along a dispersion direction of said dispersed image to measure the size of said discontinuity.

* * * * *